United States Patent

[11] 3,629,681

| [72] | Inventor | David Gurwicz<br>Gateshead, England |
| --- | --- | --- |
| [21] | Appl. No. | 26,694 |
| [22] | Filed | Apr. 8, 1970 |
| [45] | Patented | Dec. 21, 1971 |
| [73] | Assignee | Sevcon Engineering Limited<br>Durham, England |
| [32] | Priority | Apr. 10, 1969 |
| [33] | | Great Britain |
| [31] | | 18,486/69 |

[54] CIRCUITS FOR CONTROLLED BATTERY CHARGERS
9 Claims, 1 Drawing Fig.

[52] U.S. Cl. .................................................. 320/21,
320/21, 320/31, 320/39, 323/22 SCR
[51] Int. Cl. .................................................. H02j 7/10
[50] Field of Search .............................. 323/22 SCR
320/21, 22, 27–34, 39, 40, 51, 53

[56] References Cited
UNITED STATES PATENTS

| 2,898,539 | 8/1959 | Lozeau | 320/32 |
| --- | --- | --- | --- |
| 2,942,170 | 6/1960 | Torre et al. | 320/27 X |
| 3,068,392 | 12/1962 | Santelman, Jr. | 321/18 |
| 3,252,070 | 5/1966 | Medlar et al. | 320/21 |
| 3,348,118 | 10/1967 | Watrous | 320/40 |
| 3,381,202 | 4/1968 | Loucks et al. | 321/2 |
| 3,414,774 | 12/1968 | Motta | 320/31 X |
| 3,535,608 | 10/1970 | Cramer et al. | 320/31 X |

*Primary Examiner*—J. D. Miller
*Assistant Examiner*—John M. Gunther
*Attorney*—Rosen & Steinhilper ABSTRACT: The illustrated embodiment of the invention is a circuit for a controlled battery charger comprising for connection with a source of rectified AC supply a series circuit including a semiconductor switch and having inductance and in parallel with the semiconductor switch a unidirectional conduction device in series with connections to which can be connected a battery to be charged the voltage of the battery exceeding the rectified AC supply voltage, control circuit means being provided to control the frequency of switching of the semiconductor switch whereby, in operation, during conduction of the semiconductor switch electrical energy is stored in the series circuit containing the switch as the current therethrough grows inductively while energy so stored is supplied to the battery in the intervals between conducting periods of the switch.

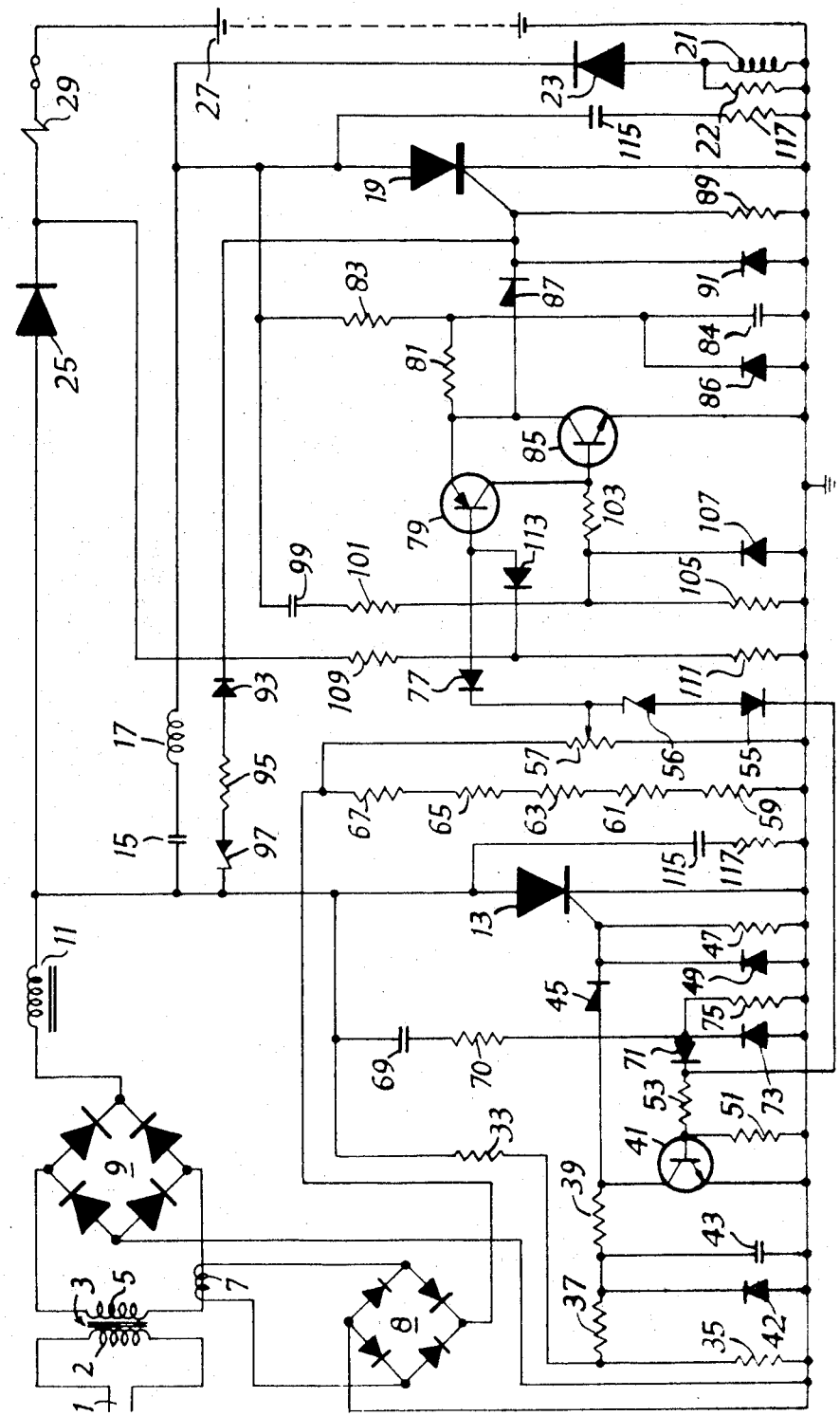

CIRCUITS FOR CONTROLLED BATTERY CHARGERS

This invention relates to circuits for controlled battery chargers. If a battery is continuously charged during the period that the applied voltage from the charging source exceeds battery voltage, the current through the battery when the battery voltage is low may reach undesirably high values. Control of the battery charging current is therefore most desirable.

Circuits for controlled battery chargers have been proposed which employ semiconductor switches, suitably, thyristors, to provide controlled charging rates from AC mains in both single-phase and three-phase systems. A typical circuit for a single-phase system has a mains transformer having a full wave rectified output across which a thyristor switch is connected in series with the battery to be charged, the thyristor switch being fired into conduction at a level in each half cycle of the rectified output voltage above the battery voltage. The firing point of the thyristor switch is advanced as the battery voltage level increases. However, the thyristor switch can only conduct for part of the period that the transformer-rectified output voltage is above battery voltage. Accordingly, the conduction period is a small fraction of each half cycle of the rectified output voltage so that to keep a reasonable charging current the instantaneous charging current has to be high. It is desirable, if not essential, that because of its high instantaneous value this short duration charging current be smoothed to provide a more limited charging current for a longer duration and to this end the mains transformer has provided in either its primary or secondary winding a ballast choke.

Because of the phase firing of the thyristor switch and the presence of the ballast choke, it will be apparent that considerable distortion of the mains wave form occurs and gives rise to poor power factor and this is not generally acceptable to the electricity supply authority. Because of the distorted loading that appears on the mains transformer, higher B.M.S. currents are taken by the battery than would be the case if the thyristor switch were absent and this means that a higher rated transformer requires to be used.

It will further be apparent that the short duration of conduction of the thyristor switch is a disadvantage inasmuch as it means that the utilization of the transformer as a whole is poor.

In the case of three-phase systems a controlled charger utilizing phase firing results in an extremely complex arrangement which is very expensive and unsatisfactory in operation.

It is an object of the present invention to provide an improved circuit for a controlled battery charger suitable for use with single-phase or three-phase AC supply means as well as with DC supply means.

The present invention comprises a circuit for a controlled battery charger comprising for connection with a source of unidirectional charging current a series circuit including a semiconductor switch and having inductance and in parallel with the semiconductor switch a unidirectional conduction device in series with connections to which can be connected a battery to be charged the voltage of the battery exceeding the charging current supply voltage, control circuit means being provided to control the switching of the semiconductor switch whereby, in operation, during conduction of the semiconductor switch electrical energy is stored in the series circuit containing the switch as the current therethrough grows inductively while energy so stored is supplied to the battery in the intervals between conducting periods of the switch.

Preferably, the control circuit means are adapted to switch the semiconductor switch to a nonconducting state when the inductive growth of current in the series circuit reaches a predetermined value.

Preferably, the control circuit means are adapted to switch the semiconductor switch to a conducting condition when the current drawn from the supply falls below a predetermined value.

Preferably, the series circuit having inductance includes an inductor in series with the semiconductor switch.

Advantageously, the semiconductor switch is a thyristor provided with commutating means.

Suitably, means are provided for maintaining the semiconductor switch in a conducting condition in the event that the battery connected to the connections is at a voltage below that of the supply whereby the inductive growth of current through the switch is used to effect disconnection of the supply.

The invention will now be described by way of example with reference to the accompanying circuit drawing.

Referring to the drawing a circuit for a controlled battery charger comprises, in series with a single-phase (it could be a three-phase) AC source 1 a primary winding 2 of a transformer 3 which has a secondary winding 5 connected in series with a current transformer 7 and the input side of a full wave rectifier bridge 9 providing unidirectional charging current. The output side of the bridge 9 is connected in series with an inductor 11 and a first thyristor 13. The output of the current transformer 7 is connected to the input side of a full wave rectifier bridge 8. Connected in parallel with the first thyristor is a commutating capacitor 15 a further inductor 17 and a second thyristor 19, the commutating capacitor 15 being connected at one side thereof to the anode of the first thyristor 13 and at the other side thereof via the further inductor 17 to the anode of the second thyristor while the cathodes of the first and second thyristors are connected to ground. Across the second thyristor 19 is connected an additional inductor 21 which is in parallel with resistor 22 and in series with a first diode 23, the latter being connected so as to conduct current in the same sense as the first thyristor 13.

Connected in parallel with the first thyristor is a second diode 25 which is disposed in series with a shunt 29 and connections between which a battery 27 to be charged is connected. The anode of the diode 25 connects with the anode of the first thyristor, the cathode of the diode 25 leading to the connection to which the positive side of the battery to be charged is connected.

The circuit so far described constitutes the power circuit and the general operation of the circuit will be described prior to the detailed description of the control circuit means which control the firing of the thyristors 13 and 19.

The power circuit described requires to be operated with a source of rectified single- or three-phase AC, the peak voltage of which is less than that of the battery being charged. If this were not the case charging current would flow in uncontrolled manner whenever the source voltage exceeded the battery voltage.

The operation of the circuit can not be appreciated. Assume initially that the commutating capacitor 15 has a positive charge on the side thereof connected with the anode of the first thyristor 13. A firing pulse is now supplied to the gate of the first thyristor 13. The charge on the commutating capacitor is thus reversed in oscillatory fashion by virtue of the presence of the inductor 21 disposed in series with the first diode 23. The commutating capacitor therefore has its plate which is connected with the anode of the second thyristor positively charged at this point in time. The conduction of the first thyristor 13 causes current to grow in the series circuit containing the inductor 11 and the first thyristor 13. At a predetermined value of this current an output of the current transformer 7 causes a firing pulse to be delivered to the gate electrode of the second thyristor 19 which is rendered conducting with the result that the commutating capacitor 15 discharges through the second thyristor 19 and thus commutates the first thyristor 13 and the commutating capacitor is recharged from the source in the forward direction, i.e. with its plate connected to the anode of the first thyristor 13 positively charged. As the commutating capacitor becomes fully charged the current flow through the second thyristor is reduced to below the hold value thereof and the second thyristor is thus commutated. During the conduction of the first thyristor the inductive growth of current in the series circuit including the inductor 11 and the first thyristor 13 causes energy to be stored in the inductor 11 and as soon as the first thyristor 13 is commutated this energy is released by the inductor and has to flow somewhere. After the capacitor 15 is fully charged the only place it can flow since the first thyristor is in the off condition is through the diode 25, shunt 29 and into the battery 27; the energy is thus supplied from the source into the battery at a higher potential level. When the current flow into the battery has dropped to a lower preset level, the current level in the current transformer 7 is again employed, this time to refire the first thyristor 13 into conduction so that inductive growth of current once again occurs in the series circuit containing the inductor 11 and the first thyristor 13. Under these conditions, therefore, energy is drawn from the source and stored in the inductor whilst the main thyristor is conducting and this stored energy is fed as a pulse into the battery when the first thyristor is in a nonconducting condition. It will be appreciated that since current flows continuously from the source the energy taken from the source must be the output voltage of the source multiplied by the current flowing. The energy fed into the battery is the voltage of the battery multiplied by the current flowing into the battery. Assuming that there are no resistive losses, and indeed such resistive losses as there are are very low; the energy balance must be satisfied, that is to say the power taken from the source must be equal to the power fed into the battery. The battery is therefore charged at a lower current than that taken from the supply 1 but at a higher voltage and it does not matter what the voltage of the battery is as long as it is above the peak output voltage of the source. The higher voltage battery one connects to the circuit the lower will be the charge rate. The circuit is governed by energy considerations, the energy taken from the source is a constant and independent of the battery connected in the circuit, the circuit is therefore rated at a certain number of kilowatts charge rate. The higher the voltage of the battery connected to the circuit the lower would be the charge rate to that battery in amps but the kilowatt rate would remain the same. Since the current from the source flows continuously maximum utilization of the transformer 3 connected to the DC bridge 9 providing the source output voltage is obtained and the power factor of the supply approaches unity. Clearly the charge rate can be controlled by varying the current levels at which the current transformer 7 causes firing of the thyristors 13 and 19.

It the event that the battery connected in series with the diode 25 has a voltage below the peak voltage of the source, sensing means hereinafter described are arranged to prevent the turning on of the second thyristor 19 so that thyristor 13 remains in conduction and current therethrough builds up until an overload device (not shown) is tripped and disconnects the supply.

It will be appreciated that other forms of semiconductor switch apart from the thyristor arrangements described can be employed, for example transistor-switching arrangements can be utilized. It is theoretically possible to use as a semiconductor switch a gate control switch, for example a silicon-controlled switch (S.C.S.). These devices, though demonstrable, are not, however, as yet commercially available. The use of such a device would avoid the circuitry described above for commutating the first thyristor. The S.C.S. would be disposed in the position of the first thyristor and alternate pulses of opposite polarity applied to the cathode gate of the device to render it successively conducting and nonconducting, the pulses being supplied as the appropriate voltages were developed for example across a resistor shunt.

The control circuit means for controlling the firing of the thyristors 13 and 19 will now be described.

Connected between the anode and cathode of thyristor 13 are series resistors 33 and 35 to the common point of which are connected series resistors 37 and 39, the end of resistor 39 remote from resistor 37 being connected to the collector electrode of NPN-transistor 41 the emitter electrode of which is connected to ground. Connected in parallel between the common point of resistors 37 and 39 and ground are a diode 42 and a capacitor 43. The collector electrode of transistor 41 is connected via a Shockley diode 45 to the gate electrode of thyristor 13 between which gate electrode and ground are connected in parallel resistor 47 and diode 49.

The base electrode of transistor 41 is connected to ground via a resistor 51 and via a resistor 53, diode 55 and zener diode 56 to the slide wire of a variable resistor 57 connected across the output side of rectifier bridge 8. A resistor switch consisting of a chain of series-connected resistors 59, 61, 63, 65 and 67 is connected in parallel with the variable resistor 57 and can be set to include in parallel with the resistor 57 some only or all of the resistors 59 to 67 thereby to control as will hereinafter become apparent the operating current levels at which switching of thyristors 13 and 19 take place. This expedient is necessary because of the different charging currents required for different batteries which may require to be charged by the circuit.

To the anode of thyristor 13 is connected a differentiating network comprising a capacitor 69 in series with a resistor 70 the latter being connected by way of a diode 71 and the resistor 53 to the base of transistor 41. Between ground and the common point of resistor 70 and diode 71 are connected in parallel diode 73 and resistor 75.

The slide wire of variable resistor 57 is connected by way of a diode 77 to the base of a PNP-transistor 79 which is connected as an emitter follower and to this end has its emitter electrode connected via series-connected resistors 81 and 83 to the anode of thyristor 19 the common point of resistors 81 and 83 being connected to ground via the parallel connected capacitor 84 and diode 86. The emitter electrode of transistor 79 is also connected to the collector electrode of NPN-transistor 85 and by way of a Shockley diode 87 to the gate electrode of the thyristor 19 between which and ground are connected in parallel a resistor 89 and diode 91. The gate electrode of thyristor 19 is further connected by way of diode 93 resistor 95 and zener diode 97 to the anode of thyristor 13.

The transistor 79 has its collector electrode connected to the base electrode of transistor 85 and the emitter electrode of transistor 85 is connected to ground. Between the anode of thyristor 19 and the base electrode of transistor 85 is connected a differentiating circuit comprising in series a capacitor 99 and resistor 101 there being a resistor 103 in series with resistor 101 and between ground and the common point of resistor 101 and 103 are connected in parallel resistor 105 and diode 107.

A sensing network is provided for keeping thyristor 13 turned on in the event of the circuit being switched on with no battery occupying the position of the battery 27 or with a battery in that position having a lower voltage than the rectified supply voltage. This sensing network comprises series resistors 109 and 111 connected between ground and the common point of the shunt 29 and diode 25 and having their common point connected via diode 113 to the base electrode of transistor 79. It will be noted that the anode to cathode paths of thyristors 13 and 19 are each shunted by a capacitor 115 and resistor 117.

The operation of the control circuit means is as follows: assume first that thyristor 19 is conducting and thyristor 13 is in a nonconducting state. In these circumstances current flows from the output side of the rectifier bridge 9, inductor 11 commutating capacitor 15 inductor 17 and thyristor 19 so that the commutating capacitor is charged with the side thereof connected to the anode of thyristor 13 at a positive potential. At this time the current in the output circuit of the bridge 9 because of the nonconduction of the thyristor 13 is low so that the voltage in the output side of the rectifier bridge 8 is also low and the voltage across the variable resistor 57 is low. No voltage is therefore applied to the base of transistor 41 via the zener diode 56 and the zener diode is thus unable to clamp transistor 41 in the conducting condition thereof. However, whilst the positive voltage at the anode of thyristor 13 is building up, the differentiating network 69 and 70 supplies the differential of the voltage at the anode of the thyristor 13 via the diode 71 to the base of transistor 41 which is thus clamped in the conducting condition thereof.

As the voltage at the anode of thyristor 13 reaches a positive maximum, the differential voltage applied via capacitor 69 and resistor 70 to the base of transistor 41 falls to zero and the transistor 41 is thus rendered nonconducting and the capacitor 43 charges therefore to a level at which the breakover voltage of the Shockley diode 45 is exceeded. A pulse is accordingly applied to the gate electrode of thyristor 13 thus rendering thyristor 13 conducting with the result that the current drawn from the bridge 9 grows inductively and as the current transformer 7 is thus experiencing a higher current the voltage on variable resistor 57 grows until the breakover voltage of the zener diode 56 is exceeded thus driving the base electrode of transistor 41 positive with the result that transistor 41 is rendered conducting and capacitor 43 is thus discharged. The pulse at the gate electrode of thyristor 13 is thus terminated but thyristor 13 remains in a conducting condition but is prevented from refiring. It will be noted also that as thyristor 13 is in a conducting state, commutating capacitor 15 has reverse charged via inductor 21 and diode 23.

As the voltage across variable resistor 57 grows further the voltage of the emitter electrode of transistor 79, which is positive because capacitor 15 has reverse charged and thyristor 19 is nonconducting, also increases, transistor 79 being in the emitter follower configuration, and in consequence the breakover voltage of the Shockley diode 87 is exceeded and thyristor 19 is accordingly fired thus causing commutation of the thyristor 13.

During reversal of the charge on commutating capacitor 15 it is important to prevent the firing of thyristor 19 since this could result in there being insufficient charge on capacitor 15 to commutate thyristor 13. Accordingly during charge reversal on capacitor 15 the differential of the positive-going voltage at the anode of thyristor 19 is supplied to the base of transistor 85 via capacitor 99 resistor 101 and resistor 103. Transistor 85 is thus held in a conducting condition. When the capacitor 15 is fully reverse charged the differential voltage at the anode of thyristor 19 is zero and the clamping effect of that differential voltage on transistor 85 is removed.

On commutation of thyristor 13 the energy stored during conduction of thyristor 13 in the inductor 11 is obliged to flow somewhere and first charges capacitor 15 again in the forward sense and then flows via diode 25 into the battery 27 to effect charging thereof. As the current drawn from the supply via the bridge 9 therefore falls, the current transformer causes a fall to occur in the voltage across the variable resistor 57 so that transistor 41 is rendered nonconducting and the voltage on capacitor 43 increases to the point where thyristor 13 is fired again and the sequence of operation thus continues.

In the event that the circuit is switched on either without a battery occupying the position of battery 27 or with a battery in that position having a voltage lower than the peak output voltage of the bridge 9, the voltage sensed at the common point of diode 25 and shunt 29 is such that the voltage appearing at the common point of resistors 109 and 111 is low and because of the emitter follower configuration of transistor 79 the emitter voltage thereof is kept low so that thyristor 19 is prevented from firing and undesirably high voltage which would arise if thyristor 13 were commutated cannot thus occur.

I claim:

1. A circuit for a controlled battery charger comprising for connection with a source of charging current supply at a first voltage, a series circuit including a semiconductor switch and having inductance and in parallel with the semiconductor switch a unidirectional conduction device in series with connections to which can be connected a battery to be charged, such battery having a second voltage exceeding said first voltage, control circuit means being provided to control the switching of the semiconductor switch for switching said semiconductor switch to a nonconducting state when the inductive growth of current in said series circuit reaches a predetermined value and to a conducting state when current drawn from said supply drops below a predetermined value, whereby, in operation during conduction of the semiconductor switch electrical energy is stored in the series circuit containing the switch as the current therethrough grows inductively whilst energy so stored is supplied to the battery in the intervals between conducting periods of the switch.

2. A circuit as claimed in claim 10, wherein the control circuit means are adapted to switch the semiconductor switch to a nonconducting state when the inductive growth of current in the series circuit reaches a predetermined value.

3. A circuit as claimed in claim 10, wherein the control circuit means are adapted to switch the semiconductor switch to a conducting condition when current drawn from the supply falls below a predetermined value.

4. A circuit as claimed in claim 1, wherein the semiconductor switch is a thyristor provided with commutating means.

5. A circuit as claimed in claim 4, wherein the commutating means include a commutating capacitor and the control circuit means are adapted to prevent initiation of commutation of the switch thyristor until sufficient charge is present on the commutating capacitor to effect commutation.

6. A circuit as claimed in claim 5, wherein the commutation means include a commutating capacitor, a commutating thyristor and means for reversing the charge on the commutating capacitor and the control circuit means are adapted to prevent conduction of the switching thyristor prior to the commutating capacitor being fully forward charged and are further adapted to prevent conduction of the commutating thyristor prior to the commutating capacitor being fully reverse charged.

7. A circuit as claimed in claim 1, wherein means are provided for maintaining the semiconductor switch in a conducting condition in the event that the battery connected to the connections is at a voltage below that of the supply whereby the inductive growth of current through the switch is used to effect disconnection of the supply.

8. A circuit as claimed in claim 1, wherein the control circuit means are adapted to afford variation of the current levels at which switching occurs of the semiconductor switch into the conducting and nonconducting condition thereof.

9. In combination, a circuit for a controlled battery charger comprising for connection with a source of charging current supply at a first voltage, a series circuit including a semiconductor switch and having inductance and in parallel with the semiconductor switch a unidirectional conduction device in series with connections to which can be connected a battery to be charged, and a battery connected to said connections, the voltage of the battery exceeding the charging current supply voltage, control circuit means being provided to control the switching of the semiconductor switch whereby, in operation, during conduction of the semiconductor switch electrical energy is stored in the series circuit containing the switch as the current therethrough grows inductively while energy so stored is supplied to the battery in the intervals between conducting periods of the switch.

* * * * *

PO-1050
(5/69)

UNITED STATES PATENT OFFICE
CERTIFICATE OF CORRECTION

Patent No. 3,629,681　　　　　　　　Dated　　December 21, 1971

Inventor(s)　　DAVID GURWICZ

It is certified that error appears in the above-identified patent and that said Letters Patent are hereby corrected as shown below:

Claim 2, line 1, "claim 10" should be --claim 9--;
Claim 3, line 1, "claim 10" should be --claim 9--.

Signed and sealed this 11th day of July 1972.

(SEAL)
Attest:

EDWARD M. FLETCHER, JR.　　　　ROBERT GOTTSCHALK
Attesting Officer　　　　　　　Commissioner of Patents

Disclaimer

3,629,681.—*David Gurwicz*, Gateshead, England. CIRCUITS FOR CONTROLLED BATTERY CHARGERS. Patent dated Dec. 21, 1971. Disclaimer filed Apr. 21, 1975, by the assignee, *Sevcon Engineering Limited*.

Hereby enters this disclaimer to claims 1 to 9 of said patent.

[*Official Gazette July 22, 1975.*]